(12) United States Patent
Lin

(10) Patent No.: US 10,464,515 B2
(45) Date of Patent: Nov. 5, 2019

(54) METHOD FOR MOTORCYCLE ACCIDENT DETECTION AND NOTIFICATION

(71) Applicant: Aeon Motor Co., Ltd., Tainan (TW)

(72) Inventor: Tong-Min Lin, Tainan (TW)

(73) Assignee: Aeon Motor Co., Ltd., Tainan (TW)

( * ) Notice: Subject to any disclaimer, the term of this patent is extended or adjusted under 35 U.S.C. 154(b) by 0 days.

(21) Appl. No.: 16/245,495

(22) Filed: Jan. 11, 2019

(65) Prior Publication Data
US 2019/0232907 A1 Aug. 1, 2019

(30) Foreign Application Priority Data
Jan. 26, 2018 (TW) .............................. 107102834 A

(51) Int. Cl.
| | |
|---|---|
| *B60R 21/013* | (2006.01) |
| *G08B 25/00* | (2006.01) |
| *G08B 25/01* | (2006.01) |
| *G07C 5/00* | (2006.01) |
| *B60R 21/00* | (2006.01) |
| *B62J 27/00* | (2006.01) |

(52) U.S. Cl.
CPC ............ *B60R 21/013* (2013.01); *B62J 27/00* (2013.01); *G07C 5/008* (2013.01); *G08B 25/009* (2013.01); *G08B 25/016* (2013.01); *B60R 2021/0027* (2013.01); *B60R 2021/01306* (2013.01)

(58) Field of Classification Search
CPC .......... B60R 21/013; B60R 2021/0027; B60R 2021/01306; G08B 25/009; G08B 25/016; B62J 27/00; G07C 5/008
See application file for complete search history.

(56) References Cited

U.S. PATENT DOCUMENTS

| | | | | |
|---|---|---|---|---|
| 6,611,784 | B2 * | 8/2003 | Tobaru ................ | B60R 16/0234 701/1 |
| 6,618,655 | B2 * | 9/2003 | Tobaru .................. | B60R 21/013 180/282 |
| 7,011,177 | B2 * | 3/2006 | Machida ................ | B60K 28/14 180/284 |
| 2001/0029438 | A1 * | 10/2001 | Tobaru ................ | B60R 16/0234 702/151 |

(Continued)

*Primary Examiner* — Hoi C Lau
(74) *Attorney, Agent, or Firm* — C. G. Mersereau; DeWitt LLP

(57) ABSTRACT

A method for motorcycle accident detection and notification utilizes a wireless communication device and a motorcycle including an instrument system and an overturn detection system. The wireless communication device can be a portable wireless communication device carried by the motorcycle driver or a built-in wireless communication device of the motorcycle. The followings steps are executed. Obtain the motorcycle speeds and the corresponding time point data. Detect whether the motorcycle is overturned, and if affirmative, the overturn sensor sends out an overturning signal and then the instrument system, by comparing the differences between the speeds before and after the overturning signal is generated, determines whether an accident is to be notified. If affirmative, an accident signal is sent to the wireless communication device which will then send accident notification messages to emergency contact persons, thereby enabling them to inform the police and to rescue the motorcycle driver.

6 Claims, 4 Drawing Sheets

(56) References Cited

U.S. PATENT DOCUMENTS

| | | | |
|---|---|---|---|
| 2001/0038202 A1* | 11/2001 | Tobaru | B60R 21/013 |
| | | | 280/805 |
| 2004/0050609 A1* | 3/2004 | Machida | B60K 28/14 |
| | | | 180/282 |
| 2019/0176622 A1* | 6/2019 | Suzuki | B60K 28/14 |
| 2019/0232907 A1* | 8/2019 | Lin | B60R 21/013 |

* cited by examiner

METHOD FOR MOTORCYCLE ACCIDENT DETECTION AND NOTIFICATION

BACKGROUND OF THE INVENTION

1. Field of the Invention

The present invention relates to a motorcycle/scooter accident detection and notification method, and particularly to a motorcycle/scooter accident detection and notification method which is capable of automatically detecting a motorcycle/scooter overturning accident and then issuing a notification once an accident occurs while the rider is riding on a motorcycle/scooter.

2. Description of Related Art

In order to provide emergency rescue to a motorcycle/scooter driver when an accident happens during the ride, for example a motorcycle/scooter crash or collisions, some of the conventional motorcycle/scooters set up a motorcycle/scooter accident detection system. The accident detection system mainly uses an overturn sensor installed in the vehicle body and connected to a dashboard device in the motorcycle/scooter, so that when the motorcycle/scooter is overturned, the overturn sensor sends a signal to the dashboard device, and then the dashboard device makes the motorcycle/scooter produce a warning sound or warning lights and the like.

However, conventional motorcycle/scooter accident detection systems control the motorcycle/scooter itself to only generate warning signals such as warning sounds or warning lights when a motorcycle/scooter is overturned. The warning signals can only attract the attention of surrounding people and passing-by vehicles. If the motorcycle/scooter is overturned at a location and time period where/when surrounding people and passing-by vehicles are scarce, then it will be difficult to find people to provide emergency help to the driver of the motorcycle/scooter, thereby delaying the timing for an ambulance to come to rescue for the motorcycle/scooter driver or passenger or both.

SUMMARY OF THE INVENTION

The objective of the present invention is to solve the problem that the conventional motorcycle/scooters are incapable of automatically detecting an accident and automatically issuing accident notifications when an accident occurs during driving, thereby delaying the timing for an ambulance to come to rescue for the motorcycle/scooter driver or passenger or both.

For brevity, "motorcycle" will be used to represent "motorcycle" or "scooter" hereinafter.

In order to achieve the foregoing objective, a motorcycle accident detection and notification method is provided by the present invention. The motorcycle accident detection and notification method uses a wireless communication device and a motorcycle including an instrument system and an overturn sensor, and under the premises that both the motorcycle and the wireless communication device are switched on, the motorcycle accident detection and notification method executes the following steps:

continuously obtaining motorcycle speeds and corresponding time point data by the instrument system;

detecting whether the motorcycle is overturned or not by an overturn sensor, wherein once the overturn sensor detects that the motorcycle is overturned, the overturn sensor sends a overturning signal to the instrument system; wherein, when the overturn sensor does not detect the motorcycle is overturned, the overturn sensor then continues to detect whether the motorcycle is overturned;

determining the motorcycle's driving state when the overturning signal is generated, wherein after the instrument system receives the overturning signal from the overturn sensor, the instrument system respectively obtains the motorcycle speeds at the time points before and after the overturning signal is generated, and then calculating the numerical differences between the motorcycle speeds before and after the overturning signal is generated, and then determining the motorcycle driving state based on whether the numerical differences are greater than or equal to a preset reference value, wherein when the differences are less than the preset reference value, then no accident to be notified and the step is returned to detect whether the motorcycle is overturned, when the differences are greater than or equal to the preset reference value, then an accident is to be notified, and the following steps are performed.

The instrument system sends an accident signal to the wireless communication device; and the wireless communication device generates accident notification messages including at least satellite positioning coordinates based on the accident signal, and transmits the accident notification messages to emergency contact persons' portable wireless communication devices.

The forgoing method for motorcycle accident detection and notification utilizes a built-in overturn sensor of the motorcycle to detect whether the motorcycle is overturned or not, once the motorcycle is detected to be overturned, then, based on the differences between the speeds before and after the overturning signal is generated, the instrument system determines whether an accident is to be notified, and if the accident is determined to be notified, the instrument system will send out an accident signal to the wireless communication device, and then the wireless communication device will send accident notification messages including satellite positioning coordinates to emergency contact persons' portable wireless communication devices, such that emergency contact persons can contact the police to rescue the motorcycle driver and passengers.

After the step of sending out the accident signal from the wireless communication device, the motorcycle accident detection and notification method of the present invention further includes the step of determining whether the accident notification message is successfully sent, and the step of forwarding the accident notification messages through a system service center, wherein the step of determining whether the accident notification message is successfully sent is as follows: after the wireless communication device sends out the accident notification messages, the wireless communication device waits within a time period of a confirmation time and then determines whether the replied read confirmation messages have been received from the emergency contact persons' portable wireless devices, and if affirmative, the wireless communication device halts the execution of the current step, otherwise the wireless communication device determines that no replied read confirmation messages are received, and then the step of forwarding the accident notification messages through a system service center will be executed, wherein the accident notification message is forwarded to an accident rescue service center by the wireless communication device, and the accident rescue service center notifies the police about the location of the accident and then the driver or the passenger or both of the motorcycle will be rescued.

DETAILED DESCRIPTION OF THE PREFERRED EMBODIMENT

These and other aspects of the embodiments herein will be better appreciated and understood when considered in conjunction with the following description and the accompanying drawings.

Figure 1:
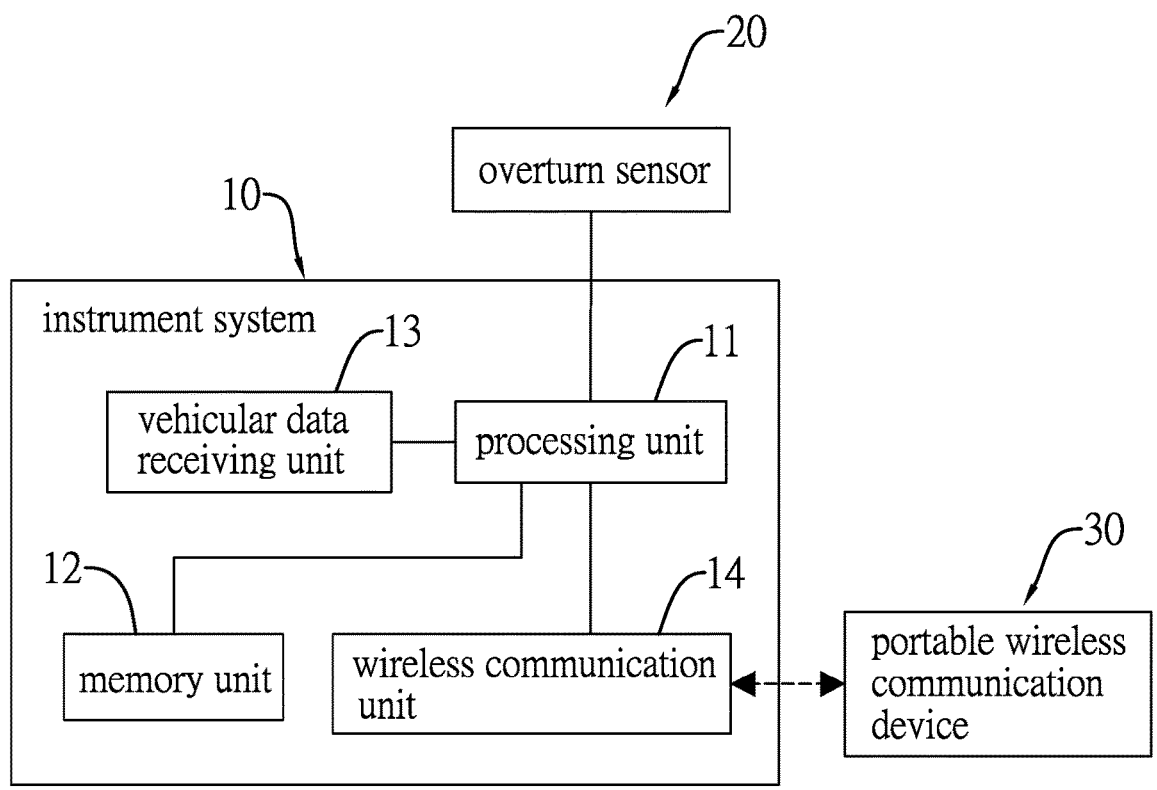
FIG. 1 is a block diagram showing an instrument system, an overturn sensor, and a wireless communication device carried by a motorcycle driver used in an embodiment of the motorcycle accident detection and notification method of the present invention.
Figure 2:
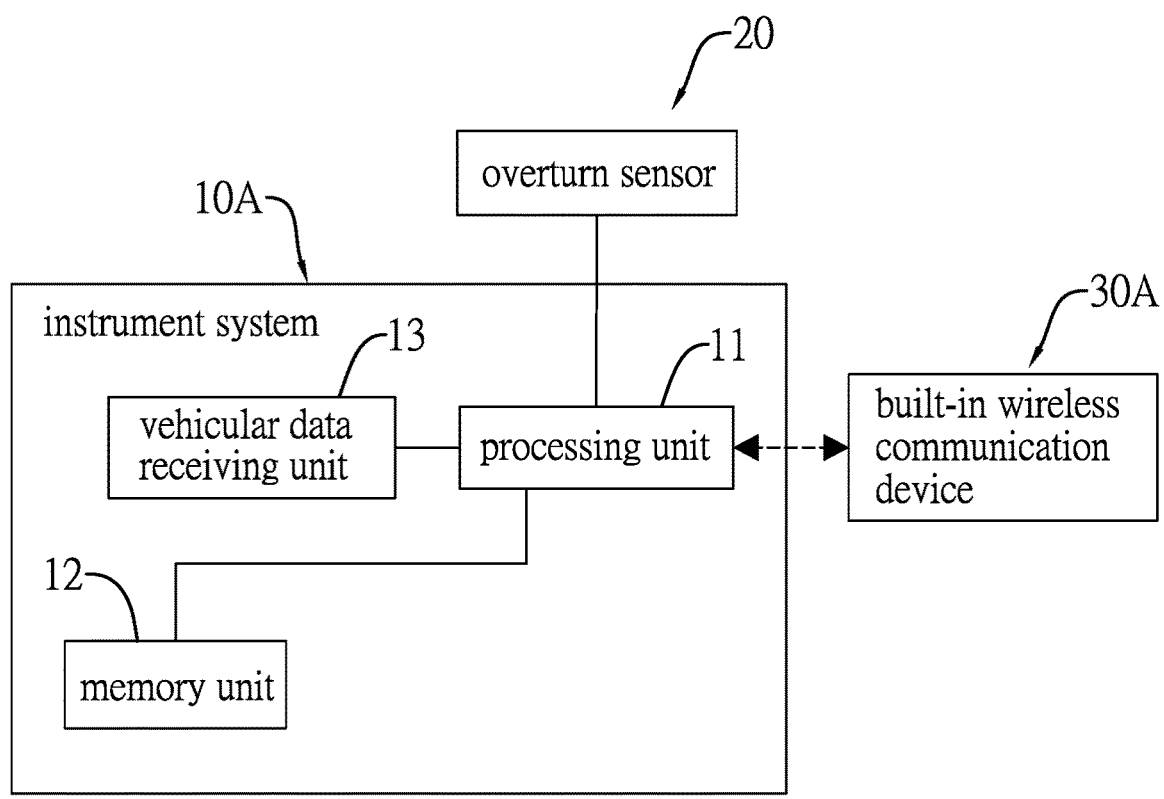
FIG. 2 is a block diagram showing an instrument system, an overturn sensor, and a built-in wireless communication device of the motorcycle used in an embodiment of the motorcycle accident detection and notification method of the present invention.

As shown in FIG. 1 and FIG. 2, the motorcycle accident detection and notification method of the present invention utilizes a motorcycle and a wireless communication device 30, 30A. The motorcycle is further equipped with an instrument system 10, 10A and an overturn sensor 20 which includes at least a tilt sensor. The motorcycle can be an ICE (internal combustion engine) motorcycle, or an electric motorcycle, etc. The instrument system 10, 10A is a digital instrument system connected to the overturn sensor 20. The instrument system 10, 10A is capable of transmitting signals by wired or wireless transmission means. As shown in FIG. 1, the wireless communication device 30 can be a portable wireless communication device such as a smart phone carried by the motorcycle driver; or, as shown in FIG. 2, the wireless communication device 30A can be a built-in wireless communication device of the motorcycle, and the wireless communication device 30, 30A is equipped with a built-in application program that can connect the instrument system 10, 10A, so that the instrument system 10, 10A can exchange data with the wireless communication device 30, 30A. The instrument system 10, 10A is also capable of performing functions, such as obtaining the satellite positioning (e.g. Global Positioning System, GPS) coordinates of the current location, setting up emergency contact information and sending/receiving messages wirelessly.

As shown in FIG. 1, the wireless communication device 30 is a portable wireless communication device such as a smart phone carried by the motorcycle driver, the instrument system 10 includes a processing unit 11 which includes at least one microcontroller chip and the like, and a memory unit 12 which includes at least one memory chip such as SRAM, DRAM, FLASH and the like, a vehicular data receiving unit 13 which includes at least one microcontroller chip or an ASIC (Application Specific Integrated Circuit) chip and the like, and a wireless communication unit 14, wherein the memory unit 12, the vehicular data receiving unit 13, and the wireless communication unit 14 are all connected to the processing unit 11 and are all capable of transmitting data. The overturn sensor 20 is connected to the processing unit 11 of the instrument system 10, and is capable of performing signal transmission by wired or wireless transmission means. The processing unit 11 of the instrument system 10 can exchange data with the portable wireless communication device 30 via the wireless communication unit 14 by way of wireless signal transmission means. The wireless signal transmission means may be a short-range wireless signal transmission means such as Bluetooth (BT) communication or Near-Field Communication (NFC), or it may be a long-range wireless signal transmission means, so that the processing unit 11 through the wireless communication unit 14 can connect the portable wireless communication device 30 such as a smart phone, to exchange digital data.

Figure 3:
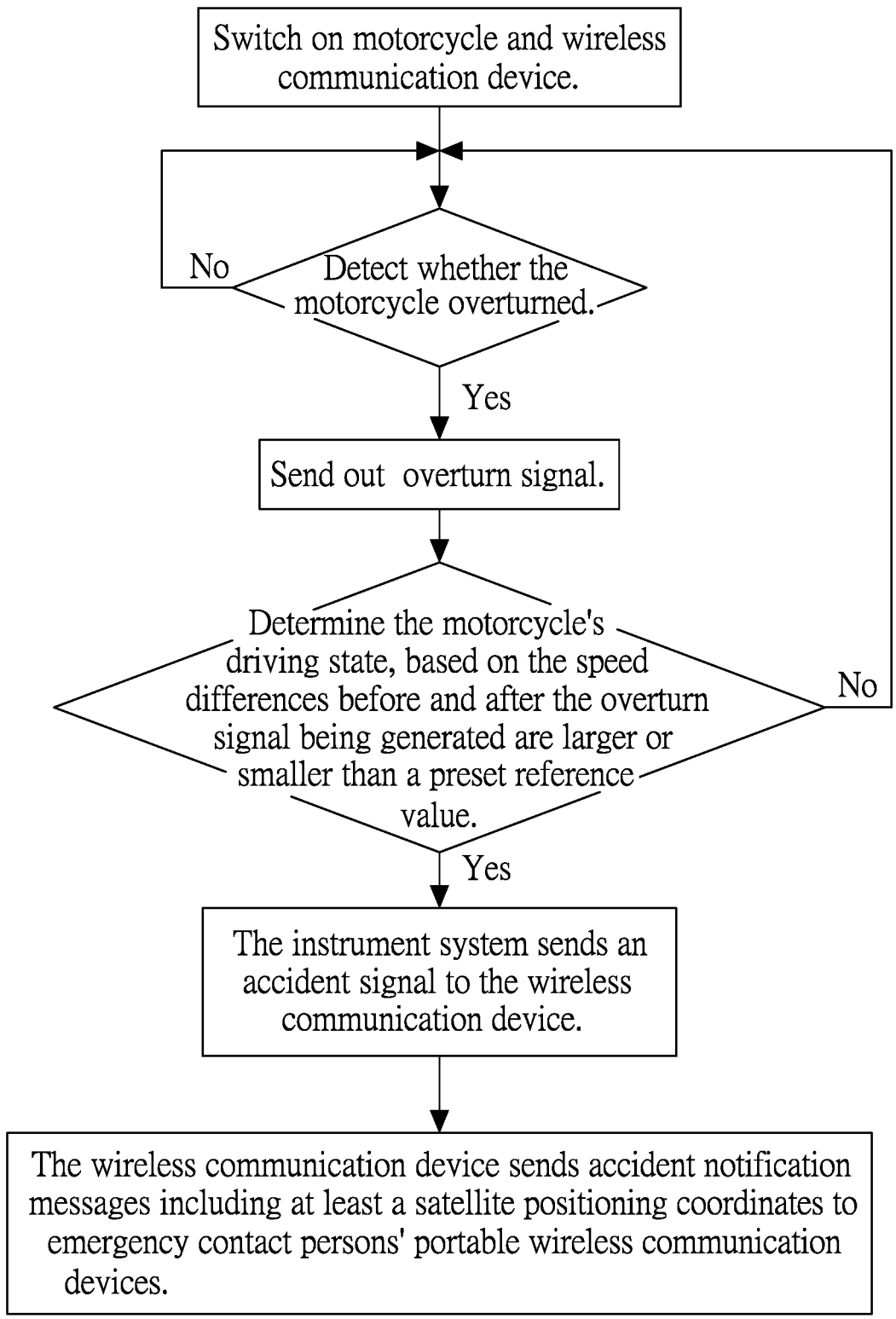
FIG. 3 is a flow chart of a preferred embodiment of the motorcycle accident detection and notification method of the present invention.

As shown in FIG. 1 to FIG. 3, when both the motorcycle and the motorcycle driver's portable wireless communication device are switched on, the motorcycle accident detection and notification method will start to perform the followings steps.

Obtain continuously the motorcycle speeds and the corresponding time point data and record the data in the memory unit 12. To be more specific, the processing unit 11 of the instrument system 10, 10A is continuously interrupted by the vehicular data receiving unit 13 at every predetermined time point to obtain the motorcycle speed and the corresponding time point data, and then the vehicle speeds and the time point data are recorded in the memory unit 12.

Detect whether the motorcycle is overturned or not. To be more specific, once the overturn sensor 20 detects that the motorcycle is overturned, the overturn sensor 20 will send an overturning signal to the processing unit 11 of the instrument system 10, 10A; when the overturn sensor 20 does not detect the motorcycle is overturned, the overturn sensor 20 then continues to detect whether the motorcycle is overturned.

Determine the motorcycle's driving state when the overturning signal is generated. Specifically, after the processing unit 11 of the instrument system 10, 10A receives the overturning signal from the overturn sensor 20, the processing unit 11 obtains the motorcycle speed at the time point which is right after the overturning signal is generated by the vehicular data receiving unit 13. Then the processing unit 11 further obtains from the memory unit 12 the vehicle speeds before the overturning signal is generated within a preset time range, and then the numerical differences between the motorcycle speeds before and after the generation of the overturning signal are calculated, and then the processing unit 11 determines the motorcycle driving state according to whether the numerical differences between the motorcycle speeds before and after the overturning signal are greater than or equal to a preset reference value, wherein when the differences between the motorcycle speeds before and after the overturning signal are determined to be less than the preset reference value, then the overturning accident of the motorcycle is an accident not to be notified, then the step is returned to detect whether the motorcycle is overturned by the overturn sensor 20, for example, the motorcycle overturning accident may occur during the initial movement of the motorcycle when the motorcycle has just been started, or when the motorcycle speed differences before and after the overturning signal are small enough to warrant that the overturning of the motorcycle is not an accident to be notified for rescue. When the processing unit 11 determines that the motorcycle speed differences before and after the overturning signal is generated are greater than or equal to the preset reference value, then the overturning accident of the motorcycle is an accident to be notified, for example, the motorcycle overturns during high speed motions and generates a overturning signal with large enough speed differences between the motorcycle speeds before and after the overturning signal is generated and thereby warrants a notification of the accident for rescue. Thereafter, the following steps are performed.

The instrument system 10, 10A sends an accident signal to the wireless communication device 30, 30A. With reference to FIG. 1 and FIG. 3, when the wireless communication device 30 is a portable wireless communication device carried by the motorcycle driver, the processing unit 11 of the instrument system 10 sends an accident signal to the wireless communication device 30 carried by the motorcycle driver through the wireless communication unit 14. With reference to FIG. 2 and FIG. 3, when the wireless communication device 30A is a built-in device of the motorcycle, the processing unit 11 of the instrument system 10A directly sends an accident signal to the wireless communication device 30A.

The wireless communication device 30, 30A generates accident notification messages including at least the satellite positioning coordinates based on the accident signal, and transmits the accident notification messages to emergency contact persons' portable wireless communication devices. To be more specific, when the accident signal is received by the wireless communication device 30, 30A, the wireless communication device 30, 30A immediately obtains the satellite positioning (e.g. GPS) coordinates of the current location, and sends accident notification messages that include at least the satellite positioning (e.g. GPS) coordinates of the current location, to the portable wireless communication devices of the preset emergency contact persons', thereby enabling the emergency contact persons to contact and inform the police about the location of the accident and the needs of rescuing the driver or the passenger or both of the motorcycle. The accident notification messages may be automatically sent by the wireless communication device 30, 30A using its built-in Short Messaging Service (SMS) or other instant messaging service software (e.g. LINE®, FACEBOOK®, etc.).

Figure 4:
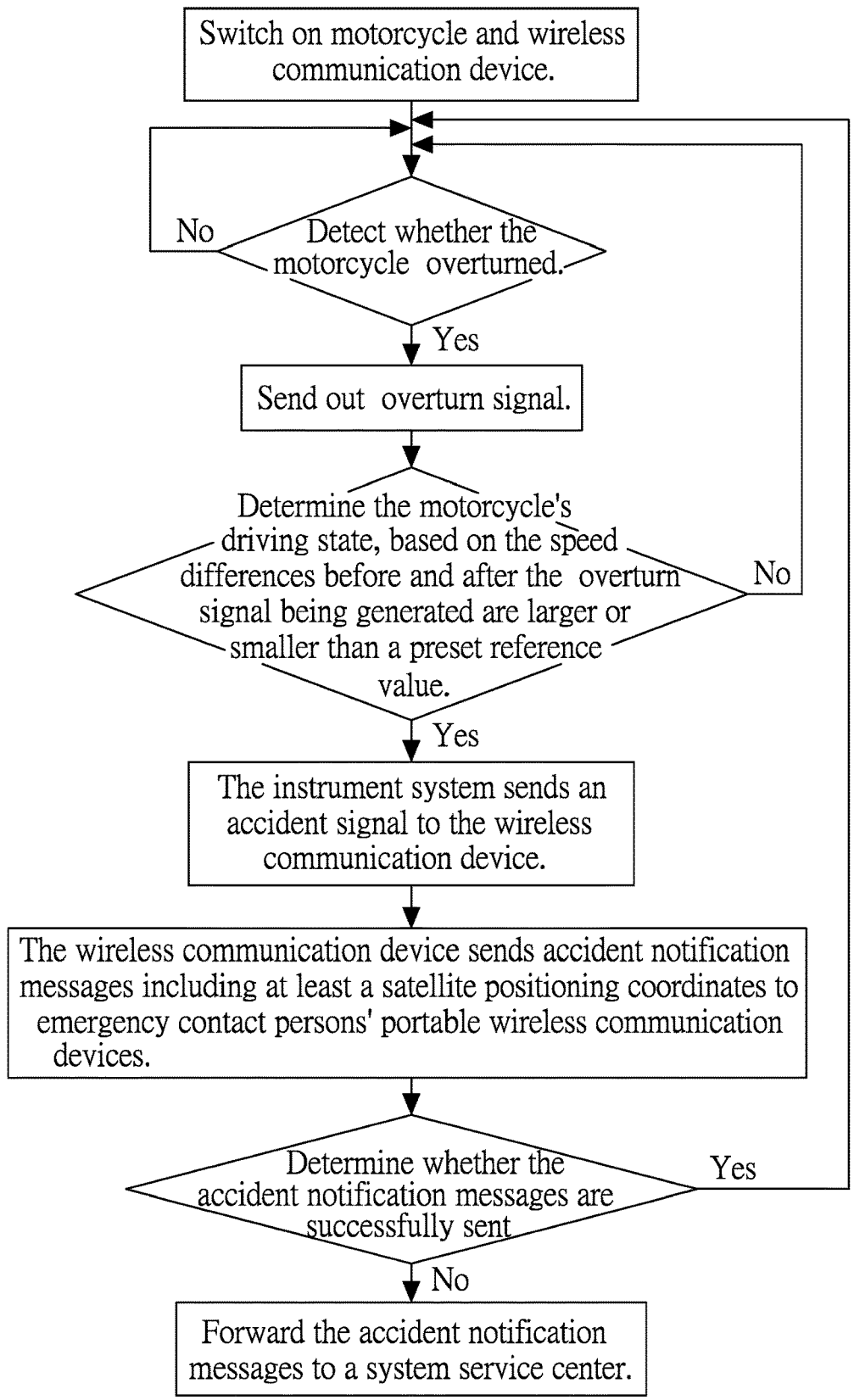
FIG. 4 is a flow chart of another preferred embodiment of the motorcycle accident detection and notification method of the present invention.

With reference to another flowchart shown in FIG. 4, after the forgoing step of sending accident notification messages, which include at least the satellite positioning (GPS) coordinates of the current location, to the portable wireless communication devices of the preset emergency contact persons', the motorcycle accident detection notification method may further include the step of determining whether the accident notification messages are successfully sent, and the step of forwarding the accident notification messages through a system service center.

The step of determining whether the accident notification messages are successfully sent is elaborated as follows. After the wireless communication device sends the accident notification messages, the wireless communication device waits within a time period of a confirmation time and then determines whether the replied read confirmation messages have been received from the emergency contact persons' portable wireless devices, and if affirmative, the wireless communication device halts the execution of the current step, otherwise the wireless communication device determines that no replied read confirmation messages are received, and then the step of forwarding the accident notification messages through a system service center will be executed, wherein the accident notification message is forwarded to an accident rescue service center, and the accident rescue service center notifies the police about the location of the accident and the driver or the passenger or both of the motorcycle will then be rescued. The accident rescue service center may be established by the police, the service center of the motorcycle manufacturer or other organizations.

According to the above descriptions, the motorcycle accident detection notification method of the present invention mainly utilizes the built-in overturn sensor of the motorcycle to detect whether the motorcycle is overturned, and once the overturn sensor determines that the motorcycle is overturned, the motorcycle's instrument system then generates the speed differences in motorcycle speeds before and after the overturning signal is generated, and based on the above differences, the motorcycle's instrument system determines whether the overturning of the motorcycle is an accident to be notified for rescue, if affirmative, the instrument system sends an accident signal to the motorcycle driver's portable wireless communication device, and then the motorcycle driver's portable wireless communication device transmits accident notification messages including the satellite positioning coordinates to the emergency contact persons' portable wireless communication devices. In this way, once an overturning accident happens, the emergency contact persons can immediately receive the notification and can contact the police to rescue the motorcycle driver and the like.

In addition, the motorcycle accident detection notification method of the present invention can further determine whether the accident notification message is successfully sent, and when the accident notification message is not successfully sent, the accident notification message is forwarded to the system service center which will further forward the notification message to the accident rescue service center, the accident rescue service center notifies the police about the location of the accident, and the driver of the motorcycle and the like will then be rescued.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A motorcycle accident detection and notification method using a motorcycle and a wireless communication device, the motorcycle further including an instrument system and an overturn sensor, the motorcycle accident detection and notification method performed with premises that the motorcycle and the wireless communication device are both switched on, and the motorcycle accident detection and notification method including the following steps:

continuously obtaining motorcycle speeds and corresponding time point data by the instrument system;

detecting whether the motorcycle is overturned or not by the overturn sensor, wherein once the overturn sensor detects that the motorcycle is overturned, the overturn sensor sends a overturning signal to the instrument system;

determining a motorcycle's driving state when the overturning signal is generated, wherein after the instrument system receives the overturning signal from the overturn sensor, the instrument system respectively obtains the motorcycle speeds at the time points before and after the overturning signal is generated, and then calculating numerical differences between the motorcycle speeds before and after the overturning signal is generated, and then determining the motorcycle driving state based on whether the numerical differences are greater than or equal to a preset reference value, wherein when the numerical differences are less than the preset reference value, then no accident is to be notified and the step is returned to detect whether the motorcycle is overturned, when the differences are greater than or equal to the preset reference value, then an accident is to be notified, and the following steps are performed:

the instrument system sending an accident signal to the wireless communication device; and the wireless communication device generating accident notification messages including at least satellite positioning coordinates based on the accident signal, and transmitting the accident notification messages to emergency contact persons' portable wireless communication devices.

2. The motorcycle accident detection and notification method as claimed in claim 1, wherein, after the step of the instrument system sending an accident signal to the wireless communication device, the method further includes the following steps:

determining whether the accident notification messages are successfully sent; and forwarding the accident notification messages through a system service center;

wherein the step of determining whether the accident notification messages are successfully sent is as follows: after the wireless communication device sends the accident notification messages, the wireless communication device waits within a time period of a confirmation time and then determines whether replied read confirmation messages have been received from the emergency contact persons' portable wireless devices, and if affirmative, the wireless communication device halts the execution, otherwise, the wireless communication device determines that no replied read confirmation messages are received, and then the step of forwarding the accident notification messages through a system service center is executed, and the accident notification message is forwarded to an accident rescue service center.

3. The motorcycle accident detection and notification method as claimed in claim 1, wherein the wireless communication device is a portable wireless communication device carried by the motorcycle driver, and the step of the instrument system sending an accident signal to the wireless communication device is that the instrument system through a wireless transmission means sends the accident signal to the portable wireless communication device carried by the motorcycle driver.

4. The motorcycle accident detection and notification method as claimed in claim 2, wherein the wireless communication device is a portable wireless communication device carried by the motorcycle driver, and the step of the instrument system sending an accident signal to the wireless communication device is that the instrument system through a wireless transmission means sends the accident signal to the portable wireless communication device carried by the motorcycle driver.

5. The motorcycle accident detection and notification method as claimed in claim 1, wherein the wireless communication device is a built-in wireless communication device of the motorcycle, and the step of the instrument system sending an accident signal to the wireless communication device is that a processing unit of the instrument system sends the accident signal to the wireless communication device through a wired transmission means.

6. The motorcycle accident detection and notification method as claimed in claim 2, wherein the wireless communication device is a built-in wireless communication device of the motorcycle, and the step of the instrument system sending an accident signal to the wireless communication device is that a processing unit of the instrument system sends the accident signal to the wireless communication device through a wired transmission means.

* * * * *